United States Patent [19]

Farnbach et al.

[11] 4,017,740
[45] Apr. 12, 1977

[54] SYNCHRONIZATION OF DIGITAL CIRCUITS BY BUS TRIGGERING

[75] Inventors: William A. Farnbach; Charles T. Small, both of Colorado Springs, Colo.

[73] Assignee: Hewlett-Packard Company, Palo Alto, Calif.

[22] Filed: Apr. 30, 1975

[21] Appl. No.: 573,298

[52] U.S. Cl. .............................. 307/208; 307/269; 328/63
[51] Int. Cl.² ................... H03K 19/08; H03K 5/13
[58] Field of Search ...... 307/269, 208, 218, 223 R; 328/63

[56] References Cited

UNITED STATES PATENTS

| | | | |
|---|---|---|---|
| 3,200,340 | 8/1965 | Danne | 307/269 |
| 3,441,342 | 4/1969 | Ball et al. | 307/269 |
| 3,670,249 | 6/1972 | Meslener | 307/269 |
| 3,801,917 | 4/1974 | Weinstein | 307/269 |

Primary Examiner—Stanley D. Miller, Jr.
Assistant Examiner—B. P. Davis
Attorney, Agent, or Firm—David A. Boone

[57] ABSTRACT

Data flow between multiple digital circuits having various internal clock rates is controlled by an asynchronous trigger bus. A trigger pulse is generated on the trigger bus when a trigger condition is simultaneously detected in two circuits desiring to communicate.

6 Claims, 4 Drawing Figures

SYNCHRONIZATION OF DIGITAL CIRCUITS BY BUS TRIGGERING

BACKGROUND AND SUMMARY OF THE INVENTION

Synchronous operation within a circuit frequently appears asynchronous when viewed by another circuit having a different operating frequency. To achieve synchronization between circuits, some known devices have included "handshake" techniques wherein a formalized sequence of signal exchange is performed to synchronize the passing of a data word from one circuit to the other. Computer interfaces frequently utilize this technique. Another technique frequently employed is the use of a "flag" signal which is provided by the receiving device each time it is ready to accept data. The flag signal is removed each time data is received, but is again provided as soon as the receiving device is ready to receive the next data word.

The present invention provides for the transmission of data between a first and second device whenever logic state decoders within the first and second circuits simultaneously decode predetermined states. The simultaneous triggering of the logic state decoders within both the first and the second circuits causes a trigger pulse to occur on the trigger bus interconnecting the two circuits. Thus, the two circuits which are operating at different clock rates may be triggered simultaneously. Communication between the two devices may be synchronized irrespective of the clock rates of the first and second circuits. Also, the clock rates need not have specific harmonic or phase relationships to enable operation in accordance with the present invention.

DESCRIPTION OF THE PREFERRED EMBODIMENT

Figure 1:
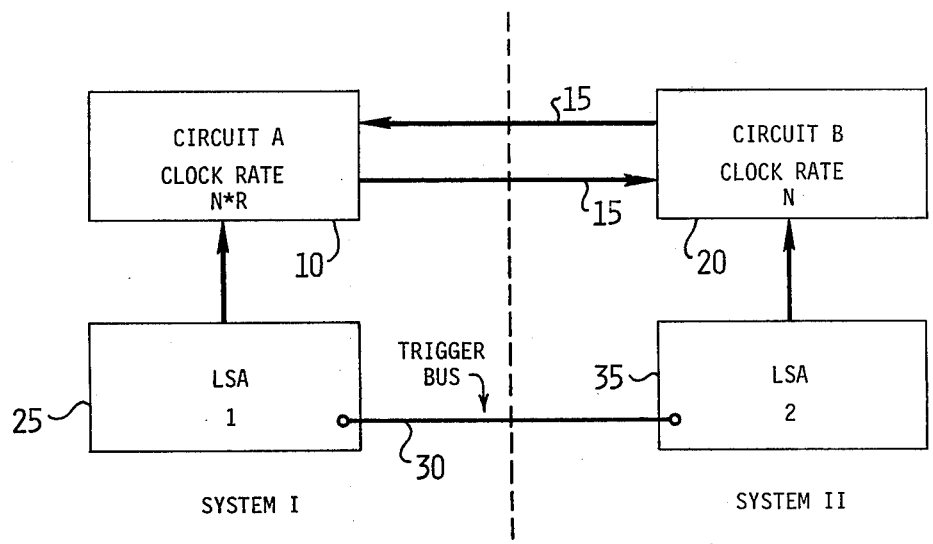
FIG. 1 is a block diagram which shows two circuits coupled in accordance with the present invention.

Referring to the block diagram of FIG. 1, a circuit 10 communicates with a circuit 20 via a bidirectional bus 15. Synchronization of the transfer is accomplished by pulses on a trigger bus 30. These pulses are provided by the simultaneous action of a pair of circuits 25 and 35. Circuits 25 and 35 are logic state analyzer circuits which detect a particular state or series of states within circuits 10 and 20, respectively. The simultaneous detection of the appropriate states by both circuit 30 and circuit 35 induces a pulse on trigger bus 30. The states causing the trigger pulse to be generated are hereinafter referred to as trigger words.

Figure 2:
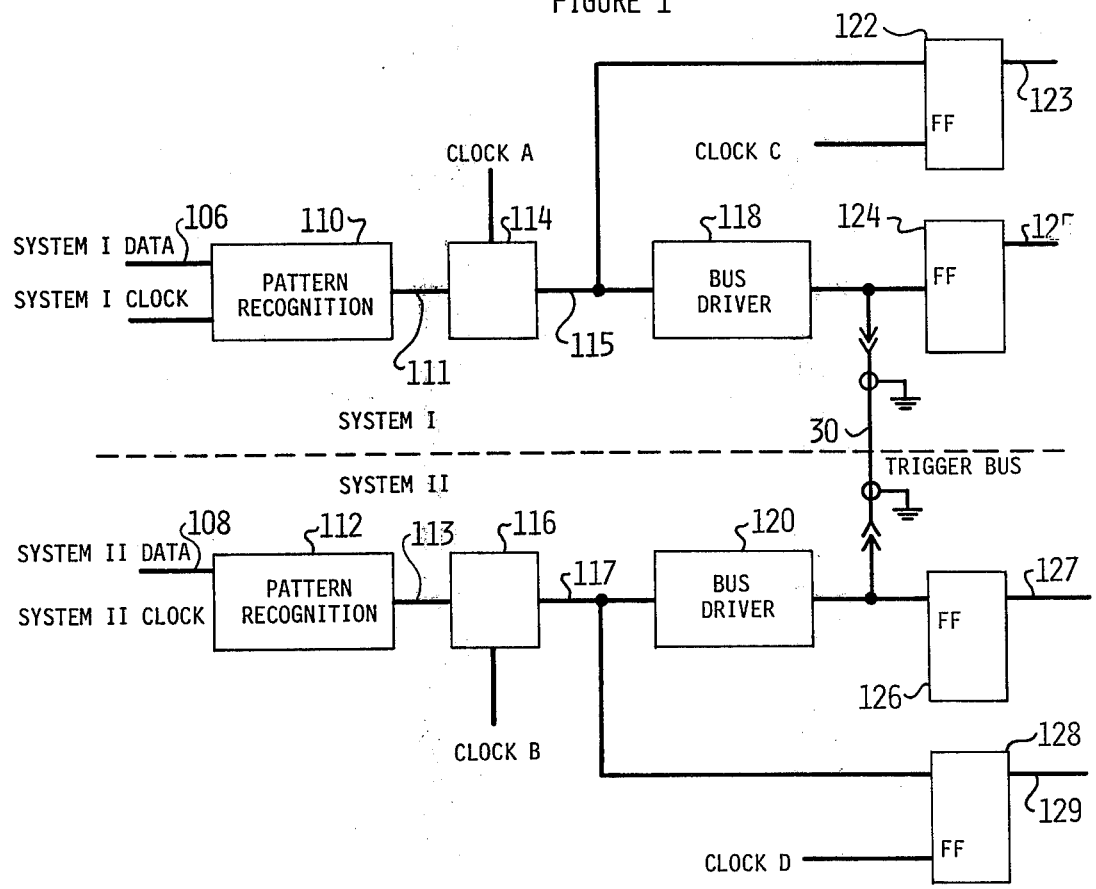
FIG. 2 is a more detailed block diagram of the two circuits shown in FIG. 1.

Referring now to the detailed block diagram of FIG. 2, trigger words are detected within data received by a first electronic system designated "System I" and a second system designated "System II" by two pattern recognition circuits labeled 110 and 112. The data is received on lines 106 and 108. When the appropriate trigger word is received by pattern recognition circuit 110, a signal is produced on line 111. Similarly, when pattern recognition circuit 112 receives the appropriate trigger word, a signal is produced on line 113. (Some techniques of achieving pattern recognition are described in U.S. Pat. No. 3,843,893 entitled "Logical Synchronization of Test Instruments" by Frank Duncan Terry.) A pair of circuits 114 and 116 perform a logical AND operation of the signals on lines 111 and 113 with clock signals A and B, respectively. This insures that a pulsed signal output will be produced on lines 115 and 117 even when the pattern recognition circuits 110 and 112 are receiving the trigger word at such a rate that they are producing essentially constant signals on lines 111 and 113.

The circuitry in Systems I and II described up to this point operate independently to produce trigger pulses which may be used for independent triggering of the respective systems. Note that the signals on line 115 and 117 are coupled to a pair of flip-flops (FF's) 122 and 128. The signals on lines 123 and 127 are particular to each separate system, and may therefore be used to trigger various operations internal to the respective systems. Clock C and Clock D set FF's 122 and 128 at any selected frequency and thereby determine the maximum frequency of the trigger pulses provided on lines 123 and 129.

Figure 3:
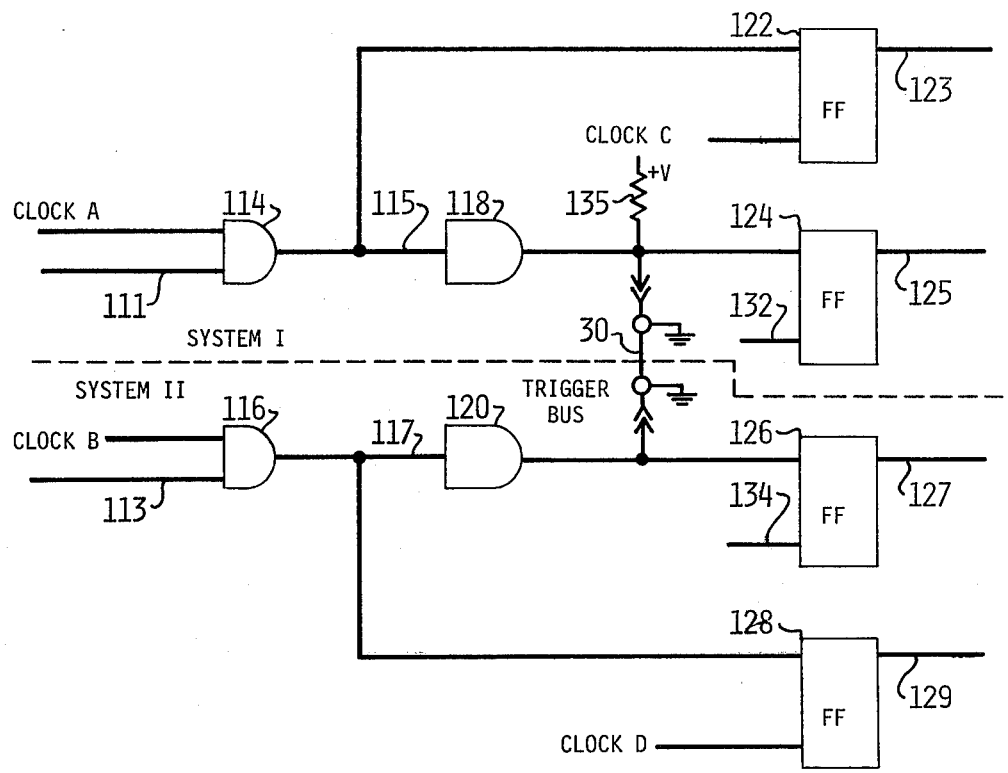
FIG. 3 is a schematic diagram of the bus communication circuitry shown in FIG. 2.
Figure 4:
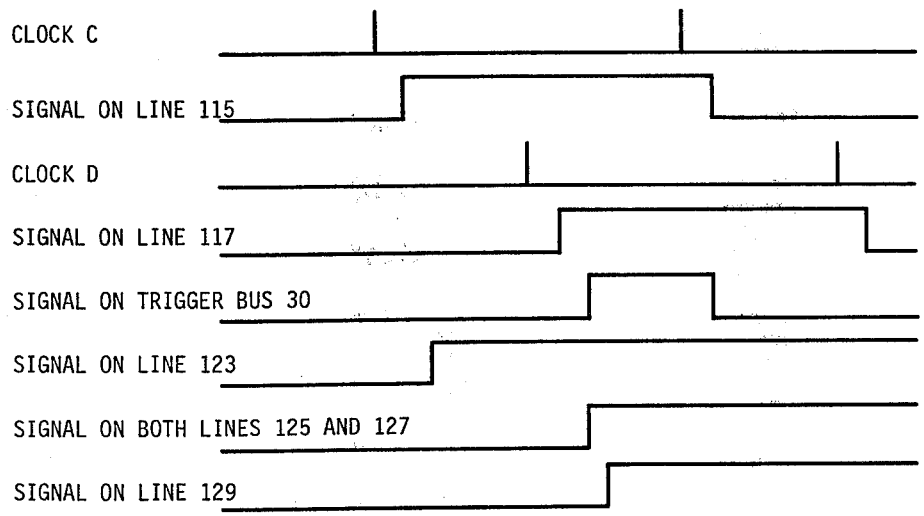
FIG. 4 is a timing diagram of the circuit of FIG. 3.

In accordance with aspects of the invention the trigger pulses on lines 115 and 117 are also used to synchronize the operation of the two systems in the following manner. Referring to the schematic diagram of FIG. 3, the trigger pulses on lines 115 and 117 are coupled to a pair of bus drivers 118 and 120. The output circuits of bus drivers 118 and 120 are preferably of the open collector type. (Any other type of AND-tieable logic circuits may also be used.) Therefore, when bus driver 118 is not receiving a signal on line 115 or when bus driver 120 is not receiving a signal on line 117, trigger bus 30 will remain in a logical zero state. However, when bus drivers 118 and 120 are simultaneously receiving signals on lines 115 and 117, a logical one signal will be generated on trigger bus 30. Resistor 135 is provided to decrease the rise time of the signal produced, but is not essential for circuit operation. The presence of the logical one signal on trigger bus 30 is coupled to a pair of FF's 124 and 126. Output signals 125 and 127 may be used to enable the transmission of data between the systems or to enable any other operations requiring synchronization of the two systems. FF's 124 and 126 may be reset by signals on lines 132 and 134 when the present synchronized operation is completed. If it is desired that these FF's automatically reset in preparation for receiving the next pulse on trigger bus 30, the signals on lines 125 and 127 may be coupled to lines 132 and 134 respectively and a clocked FF used for FF's 124 and 126. Waveforms of the signals described above are shown in FIG. 4.

We claim:

1. A method for synchronizing the simultaneous interrogation of a plurality of digital circuits, said method comprising the steps of:
    detecting a first logical state within a first digital circuit; said first digital circuit being responsive to first clock signals;
    detecting a second logical state within a second digital circuit; said second digital circuit operating asynchronously with respect to said first digital circuit and not being responsive to said first clock signals nor to phase or harmonically related components derived therefrom;
    providing a first logic level to an electrical signal line in response to the detection of said first logic state;

providing a first logic level to said electrical signal line in response to the detection of said second logic state;

inhibiting the production of said first logic level and providing a second logic level to said electrical signal line if said first and second logic states are not detected simultaneously; and generating one or more enable signals in response to said first logic level.

2. The method as in claim 1, wherein the step of detecting the first logical state includes the step of recognizing a first selected pattern of logical events within the first digital circuit.

3. The method as in claim 2, wherein the step of detecting a second logical state includes the step of recognizing a second selected pattern of logical events within a second digital circuit.

4. The method as in claim 3, wherein the step of detecting a first logical state includes the step of generating a first control signal when the first logical state is detected.

5. The method of claim 4, wherein the step of detecting a second logical state includes the step of generating a second control signal when the second logical state is detected.

6. The method as in claim 5, wherein the step of generating one or more enable signals includes the step of generating a first enable signal in the first digital circuit and the step of generating a second enable signal in the second digital circuit.

* * * * *